United States Patent Office 3,185,623
Patented May 25, 1965

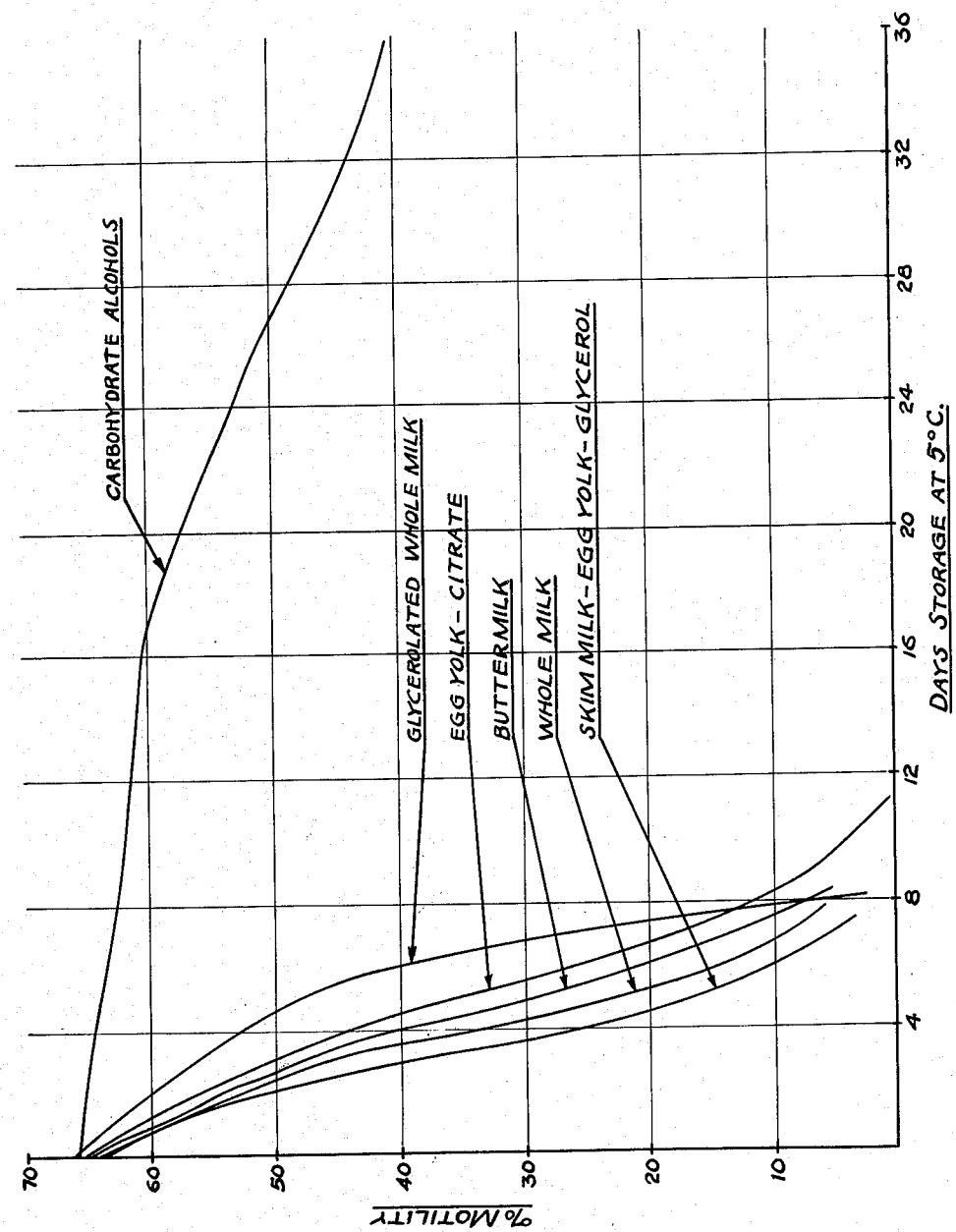

3,185,623
PRESERVATION OF ANIMAL SEMEN
Fred Smith, Wayzata, and Edmund F. Graham, St. Paul, Minn., assignors to The Regents of the University of Minnesota, Minneapolis, Minn., a corporation of Minnesota
Filed Mar. 20, 1961, Ser. No. 99,007
23 Claims. (Cl. 167—53.2)

This application is a continuation-in-part of Serial No. 33,020, filed May 31, 1960, and now abandoned.

This invention relates to the preservation of animal tissues and cells such as semen, blood cells, bone marrow and the like. More particularly this invention relates to the use of certain carbohydrate alcohols (i.e., sugar alcohols or alditols) and cyclitols and cyclitol derivatives in the preservation of animal cells and tissues. The invention is described in greater detail with respect to the preservation of animal semen since the results in this area of investigation can be more quickly and readily determined and evaluated. It is to be understood, however, that the applicability of the claimed preservative material and process is not limited to this one use.

The artificial insemination of animals, particularly of dairy cattle, has been widely practiced. Numerous breeding associations exist for the purpose of maximum utilization of quality breeding stock in order to maintain and raise the quality of herds. Under ordinary refrigerated storage conditions, animal semen is relatively short lived. The fertility and motility of sperm cells declines at such a rapid rate that it is common practice to discard all bull semen unused 48 hours after ejaculation. By use of the present invention, it has been found that surprisingly sperm may be maintained for substantially longer periods of time without appreciable loss of fertility or motility.

Heretofore, artificial insemination has been largely limited to bovine animals because it has not been possible to maintain the effectiveness of semen of other species long enough to make its use by artificial insemination practicable. The present invention opens up the field of artificial insemination for other animal species.

It has been previously suggested that the seminal plasma of certain mammalian species contains small quantities of the sugar alcohol sorbitol and the cyclitol inositol. It has not previously been suggested, however, that added amounts of these and other polyhydroxy alcohols have a surprising and unexpected stabilizing or preservative effect upon the sperm cells which materially extends the length of time during which semen so treated is useful for insemination.

In the area of blood preservation present methods cause a great waste of collected blood. The increasing demand for stored blood has outmoded the present methods of preservation. The multitude of blood banks and research laboratories devoted to studies of blood has created a need for a better method of storage in order to avoid the reduced efficiency of professional manpower and rigid limitations on blood research enforced by present methods.

Blood research is directed largely to studies of blood composition, relationship of blood composition to various pathogenic and pathological characteristics and conditions, relationship of blood composition to various healthy, vigorous physical conditions and the like. Such studies require the collection and storage of large quantities of blood samples. Under present methods of blood storage hemolysis occurs within 2 to 4 days, which renders the red cells useless for most purposes. Increasingly, studies are being made of other body tissues and cells and banks of bone marrow and similar materials are being maintained. The same problem of maintaining these tissues and cells in healthy usable condition for substantial periods of time are present.

Additional problems of preservation of animal materials are present in various tissue banks, such as marrow banks, muscle banks, artery banks and the like where the usable life of the materials is limited by existing methods of preservation and storage.

One object of this invention is to provide a method of preserving animal cells and tissues by suspension in a solution containing carbohydrate or sugar alcohols (alditols), or cyclitols or derivatives thereof.

A further object of this invention is to provide a method for the preservation of animal semen by suspension in a solution containing carbohydrate alcohols or cyclitols or derivatives thereof.

A still further object of this invention is to provide a preservative composition of matter for the preparation of semen extenders.

Still another object of this invention is to provide as a new composition of matter a stable mixture of animal semen and an added amount of a carbohydrate alcohol or a cyclitol or cyclitol derivative.

Another object of this invention is to provide a method of artificial insemination of animals utilizing a stable mixture of animal semen and an added amount of a carbohydrate alcohol or cyclitol or cyclitol derivative.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The effectiveness of a preferred embodiment of the present invention in extending the useful life of bovine semen, as compared with diluents in common use, is shown in the single figure of the drawing.

The carbohydrate alcohols which have been found to be useful in extending the life of animal semen are the sugar alcohols having the formula $C_nH_{n+2}(OH)_n$ wherein $n$ is a whole number from 4 to 7. Exemplary of these alcohols are erythritol, threitol, arabitol, ribitol, xylitol, mannitol, sorbitol (glucitol), dulcitol, iditol, and sedoheptitol. The cyclic polyols or cyclitols which may be used have the formula $C_6H_6(OH)_6$. Exemplary cyclitols and derivatives include meso-inositol $(C_6H_6(OH)_6)$ and isomers, pinitol (dextro-monomethyl ether of meso-inositol) $(C_6H_6(OH)_5OCH_3)$, quebrachitol (levo-monomethyl ether of meso-inositol) $(C_6H_6(OH)_5OCH_3)$, conduritol $(C_6H_6(OH)_4)$, scyllitol $(C_6H_6(OH)_6)$, epi-meso-inosose $(C_6H_6O(OH)_5)$, dextro-quercitol $(C_6H_7(OH)_5)$, betitol $(C_6H_8(OH)_4)$ and mytitol $(C_6H_5(OH)_6CH_3)$.

For use, the stabilizing alcohols are prepared as aqueous solutions. Water is the usual solvent but, for insemination purposes, milk or other essentially aqueous liquids may be used. The stabilizing alcohols may be used singly or in combination. The alcohol solutions are used in concentrations between about 0.1% (100 mg. percent) and concentrations which approach the isotonic limit of the animal material to be stabilized. In general, total added alcohol will not exceed about 1.5 to 2% (1500 to 2000 mg. percent). Preferably, the added alcohols are present in total concentration between about 0.5 and 1.5% (500 to 1500 mg. percent).

At these concentrations, the added alcohol is present in amounts several orders of magnitude greater than the amount which is naturally present in diluted semen. For example, bull semen contains alcohols averaging about 0.1% (100 mg. percent). For insemination, bull semen is commonly diluted 1 to 100. This reduces the natural alcohol concentration to 1/100 of the original concentration, or 0.001% (1 mg. percent). If the diluent contains added alcohol in 1% concentration (1000 mg. percent) the added alcohol is present in amount one thousand times greater than that naturally present.

The alcohol-containing semen diluent solution commonly contains a buffering agent to protect the solution against rapid and material changes in hydrogen ion concentration. The buffering materials are those commonly used for this purpose and include soluble salts, such as alkali, metal, citrates, phosphates, acetates, carbonates and the like. In the preservation of blood cells, alkali metal citrates also function as anticoagulants. The buffering agents may be used singly or in combination. For example, both an alkali metal citrate and an alkali metal phosphate may be present, or a sodium citrate and a potassium citrate may be used. The buffer is normally present in amounts from about 0.025% to 1.5% (25 to 1500 mg. percent) i.e., 0.25 to 1.5 parts by weight dissolved in 100 parts of water.

The semen diluent solution according to the present invention may also contain any of a large number of substances commonly used in prior semen diluents. These include such substances as whole milk, skim milk, glycerol, egg yolk, gelatin, glucose, fructose (to supplement the fructose naturally occurring in semen), lecithin, lipoproteins, antibiotics such as streptomycin and penicillin, and the like. Sugars may be present in amounts from about 0.125% to 0.75% (125 to 750 mg. percent) i.e., 0.125 to 0.75 part by weight dissolved in 100 parts of water.

It is known that certain polyhydroxy alcohols have an inhibiting or counteracting effect upon antibiotics. For this reason, when the presence of disease organisms is suspected in the semen, it is desirable that the semen first be treated with the antibiotic for a period of about six hours and thereafter the stablizing alcohol is added.

Because cells, such as sperm cells in semen, are subject to mechanical shock, the diluent should desirably also include a water soluble colloidal shock stabilizer such as gelatin, agar, guar gum, tragacanth, gum arabic, dextrin, gum ghatti and the like. The shock stabilizer is desirably present in amounts ranging from about 0.1% to 1.0% (100 to 1000 mg. percent) i.e., 0.1 to 1 part by weight dissolved in 100 parts of water. The diluted semen mixture desirably has an osmotic pressure between about 200 and 350 milliosmoles, and preferably about 300 milliosmoles.

The neat semen is commonly diluted with from about 10 to 200 parts of the diluent solution. The extent of dilution is dependent upon such factors as concentration of sperm cells in the semen, concentration of sperm cells normally required for conception and volume of semen normally required for conception. This varies among the several species. As an example, bull semen normally contains between about 600 and 1200 million sperm cells per cc. About 10 million sperm cells are thought necessary to insure conception. A volume of at least one cc. of semen is required. Accordingly, the neat semen may be diluted with the diluent solution containing stabilizing alcohols to produce a product containing at least 10 million sperm cells per cc. Out of an abundance of caution, it is common practice to prepare the extended semen to at least twice this sperm cell concentration.

Ram semen normally contains from about 800 to 4000 million sperm cells per cc. At least 25 million sperm cells in ½ cc. of semen is believed to be necessary to insure conception. Boar semen normally contains from about 25 to 1,000 million sperm cells, or an average of about 400 million sperm cells, per cc. Fifty to seventy cc. of semen containing at least 2 billion sperm cells is thought necessary to insure conception. Cock semen normally contains up to about 60 million sperm cells per cc. A volume of about 1/10 cc. containing at least 6 million sperm cells is thought to be necessary to insure fertilization.

Preferred carbohydrate alcohols which have been found to be successful in extending the life of animal semen are sorbitol (D-glucitol) and mannitol used either singly or in combination. Total concentration of these carbohydrate alcohols should in most cases not materially exceed about 1.5% to 2.0% (1500 to 2000 mg. percent) i.e., 1.5 to 2 parts by weight dissolved in 100 parts of water. As little as about 0.1% to 0.5% (100 to 500 mg. percent) i.e., 0.1 to 0.5 part by weight dissolved in 100 parts of water, total concentration may be used, but desirably the carbohydrate alcohols are present in a concentration of about 1% (1000 mg. percent). Although desirably used in about equal proportions when in combination, it has been found that these materials may be used together with good effect in proportions ranging from about 70% of sorbitol to 30% of mannitol to about 30% of sorbitol to 70% of mannitol. Only slight difference in results is seen when the carbohydrate alcohols are varied within these limits. The carbohydrate alcohols are dissolved in aqueous solution. Water may be used as the solvent or it may be milk or other essentially aqueous liquids.

In one form, the tissue and cell preservative composition of this invention is prepared in dry, powdered form for shipment and storage in sealed packets, the contents of which are added to a predetermined volume of diluent liquid, such as distilled water, and then combined with the semen or other animal material. Desirably the mixture includes the preservative alcohol material, a buffering agent, a sugar nutrient and a colloid stabilizer. An exemplary mixture includes from 0.25 to 0.75 part by weight of sorbitol; 0.25 to 0.75 part of mannitol; 0.25 to 0.75 of fructose; 0.05 to 0.15 part of sodium citrate; 0.05 to 0.15 part of potassium citrate; 0.05 to 0.15 part of potassium dihydrogen phosphate; and 0.1 to 0.5 part of a colloidal stabilizer, such as one of those enumerated. Optionally, from about 1 to 3 parts of dry powdered milk and/or about 8 to 10 parts of dry powdered egg yolk may be included. When ready for use, this material is merely dissolved in 100 parts of distilled water and admixed with the semen or other animal tissue or cells to produce the desired dilution.

Much semen for artificial insemination is preserved by freezing. Freezing is an effective preserving method but the same problem, with respect to maintaining potency after thawing, exists as with fresh semen, except that the life of frozen semen after thawing is even shorter. When diluted with extenders commonly in use, frozen semen lives for only about six hours after thawing. When extended with diluent solution containing stabilizing alcohols according to the present invention, effective semen life has been extended to four and five days.

In addition to being used as a diluent for semen in artificial insemination, such solutions may likewise be used to create a more favorable environment for natural insemination. It is known that in many females the time period during which conception is possible is of short duration. Conception depends upon the presence of viable semen in the Fallopian tubes during that period. In order to extend the time during which the semen is available for impregnation a douche of a buffered solution of carbohydrate alcohols may be administered prior to deposition of the semen in the female organs.

The effectiveness of the preferred preservative materials of the present invention, when used as a bovine semen extender, as compared with other extenders currently in use, is shown in the single figure of the drawing. Effectiveness is measured by observing the effect of days of storage time of semen under refrigerated conditions at 5 degrees C. against percent motility of the sperm cells. It will be noted that when the conventional diluents are used, such as glycerolated whole milk, egg yolk-citrate, buttermilk, whole milk, skim milk-egg yolk-glycerol extenders are used, the sperm motility drops off rapidly and is less than 50% by the second to fifth day. The observations with respect to the conventional extenders are the average results based on six ejaculations.

Using conventional diluents, it is the usual practice to discard the semen as worthless after two days. When sperm motility is less than 50% the rate of returns is so high that its use is not practicable. As noted in the drawing, by the seventh to the eleventh day, virtually all of the sperm cells suspended in the conventional diluents are non-motile. In contrast, the sperm diluted with solutions of the carbohydrate alcohols (specifically, a diluent solution containing equal amounts of mannitol and sorbitol in total concentration of 1%) shows virtually undiminished motility for more than two weeks under refrigerated storage and then, when the motility does begin to drop off, the change is gradual so that by the twenty-sixth to twenty-seventh day of storage 50% of the cells are still motile. The curve representing the preservative effect of the carbohydrate alcohol addition is based on the average results observed from 26 samples of ejaculate.

The invention is further illustrated by the following examples.

*Example I*

A diluent for semen was prepared by admixing 30 parts by weight of egg yolk with 25 parts of whole milk, heat treated by raising the temperature to 92° C. for two minutes. To this was added 0.25 part of gelatin, 0.5 part D-glucitol, 0.5 part of D-mannitol, 0.5 part D-fructose, 0.1 part potassium citrate, 0.1 part sodium citrate and 0.1 part potassium dihydrogen phosphate. Forty-five parts of water were added. Streptomycin was added in the amount of 500 micrograms per milliliter of solution along with 500 units of penicillin per milliliter of solution. The solution had a final pH of 6.4. The solution had an osmotic pressure of 300 milliosmoles.

*Example II*

In a field test of the diluent solution of Example I, containing carbohydrate alcohols, a sample of neat semen from one bull was split and one-half was diluted 1:71 in the solution of Example I, and the other half, used as a control, was diluted with glycerolated whole milk in the same proportion. The glycerolated whole milk was milk heat-treated by raising the temperature to 92° C. for two minutes to which 10% glycerol is added. The resulting diluted semen was distributed to 100 artificial insemination technicians and 334 cows were serviced with it. All of the semen was used on the third day after collection. The semen containing the carbohydrate alcohols was used to service 192 cows. Of these, 147 cows, or 76.6%, were successfully bred on the first service. The semen diluted with glycerolated whole milk was used to service 142 cows. Of these, 90 cows, or 63.4%, were successfully bred. The rate of successful insemination was 13.2% higher using the carbohydrate alcohol extended semen.

*Example III*

In a further comparative field test, semen from a normally low conception bull was split. Part was extended with conventional diluents and the remainder was extended with semen diluent containing carbohydrate alcohols as in Example I. A control group of 246 cows were serviced using only two day old semen. Of this group 202 cows, or 82.1%, were successfully bred. A test group of 287 cows was serviced with the carbohydrate alcohol extended semen on the fourth day. A total of 224 cows, or 78%, was successfully bred. A further test group of 99 cows were serviced with the carbohydrate alcohol extended semen on the fifth day. A total of 79 cows, or 79.7%, was successfully bred. Although the rate of non-returns in the test group was slightly lower (though not statistically significant) than that in the control group, the semen used in the test groups was two and three days older than that used in the control group and normally is considered to be of such low fertility as to be virtually worthless for artificial insemination.

*Example IV*

A still further comparative field test was made. A sample of bull semen was split. One portion used as a control was diluted with a conventional extender and used to service 166 cows. Of these, 149 were successfully bred for a value of 89.7% non-returns. The control semen sample was used on the second day. The remainder of the semen was diluted as in Example I with carbohydrate alcohol containing liquid. This material was stored and was not used until the fifth day. The test group contained 275 cows and, of these, 232 cows, or 84.3%, were successfully bred. Here too, although the test group had a somewhat lower (though statistically non-significant) rate of non-returns, the semen used in the test group was three days older than the normal maximum age of semen to be used for artificial insemination. The rate of non-returns when using five day old semen would normally be expected to approach zero.

*Example V*

Another field test was made using 10 day old semen diluted with the material of Example I and maintained under refrigeration until used. A test group of 22 cows were serviced. Of there, a total of 15 cows, or 70%, were successfully impregnated.

*Example VI*

In field tests utilizing only sorbitol as the stabilizing sugar alcohol, a diluent solution was prepared generally according to Example I with the exception that the 0.5 part of mannitol was replaced with sorbitol to give a total sorbitol concentration of 1%. Bull semen was diluted 1:75 with this solution. This extended semen was used on the fourth day to service 586 cows. Of these, 438, or 74.7%, were successfully bred on the first service.

*Example VII*

The effectiveness of mannitol alone was similarly evaluated in field tests. A diluent solution was prepared generally according to Example I with the exception that the 0.5 part of D-glucitol was replaced with D-monnitol. Four day old bull semen diluted 1:75 with this solution was used to service 465 cows. Of these, 313, or 67.3% were successfully bred on the first service. In a companion field test, 325 cows were serviced with bull semen in a diluent solution containing 1% mannitol. Of these, 72.4% were successfully bred.

*Example VIII*

Motility studies were made on the semen of other animal species. Semen of swine, rams, goats, rabbits, dogs and cats was extended using the composition of Example I as a diluent. In the case of swine, it was found that the semen after fourteen days of storage had over 50% motility. Semen of the other species had over 50% motility after storage as follows: ram, 20 days; goat, 12 days; rabbit, 6 days; dogs, 10 days; and cat, 5 days.

*Example IX*

Motility studies were made on bull semen utilizing a variety of different alcohols in a variety of concentrations. A standard buffered solution containing 2.9% sodium citrate (2900 mg. percent) was used as a control. The semen was diluted to a concentration of 20 million sperm cells per cc. For varying concentrations of alcohols the amount of buffer was reduced in amount corresponding to the added alcohol in order to maintain the osmotic pressure substantially uniform. This was an accelerated experiment and sperm life was considerably shortened by the absence of the usual sperm nutrient materials. Observations were made microscopically to evaluate sperm motility. The results are summarized in the following table wherein the hours of more than 50% sperm motility, the hours of more than 25% sperm motility and the total hours of sperm lift are shown. The observations were ended after 192 hours. At this time, some samples still exhibited some motility and these are indicated by one asterisk (*). Other samples exhibited considerable motility at the end of 192 hours. These are indicated by two asterisks (**).

| Test material | Hours above 50% motility | Hours above 25% motility | Total hours of life |
|---|---|---|---|
| 2.9% sodium citrate control | 20 | 30 | 56 |
| Erythritol, mg. percent: | | | |
| 100 | 90 | 124 | 148 |
| 200 | 90 | 128 | 156 |
| 300 | 96 | 132 | 168 |
| 400 | 72 | 136 | 192 |
| 500 | 72 | 144 | *192 |
| 750 | 96 | 144 | **192 |
| 1,000 | 96 | 144 | *192 |
| D-L-arabitol, mg. percent: | | | |
| 100 | 64 | 88 | 144 |
| 200 | 68 | 102 | 168 |
| 300 | 72 | 104 | 168 |
| 400 | 72 | 120 | 192 |
| 500 | 88 | 114 | *192 |
| 750 | 88 | 120 | 192 |
| 1,000 | 88 | 110 | 168 |
| D-arabitol, mg. percent: | | | |
| 100 | 64 | (1) | (1) |
| 200 | 64 | (1) | (1) |
| 300 | 96 | (1) | (1) |
| 400 | 96 | (1) | (1) |
| 500 | 96 | (1) | (1) |
| 750 | 96 | (1) | (1) |
| 1,000 | 72 | (1) | (1) |
| Ribitol, mg. percent: | | | |
| 100 | 56 | 102 | 144 |
| 200 | 68 | 108 | 168 |
| 300 | 96 | (2) | (2) |
| 400 | 96 | 120 | 192 |
| 500 | 104 | 120 | *192 |
| 750 | 104 | 144 | **192 |
| 1,000 | 68 | 120 | 168 |
| Xylitol, mg. percent: | | | |
| 100 | 56 | 84 | 120 |
| 200 | 68 | 102 | 168 |
| 300 | 72 | 114 | 192 |
| 400 | 84 | 128 | 192 |
| 500 | 96 | 144 | *192 |
| 750 | 96 | 144 | **192 |
| 1,000 | 72 | 144 | *192 |
| Mannitol, mg. percent: | | | |
| 100 | 40 | 56 | 120 |
| 200 | 64 | 108 | 192 |
| 300 | 68 | 128 | 192 |
| 400 | 72 | 136 | 192 |
| 500 | 72 | 136 | *192 |
| 750 | 92 | 144 | *192 |
| 1,000 | 72 | 126 | 192 |
| Sorbitol mg. percent: | | | |
| 100 | 56 | 88 | 144 |
| 200 | 56 | 108 | 192 |
| 300 | 68 | 120 | 192 |
| 400 | 72 | 132 | 192 |
| 500 | 100 | 144 | *192 |
| 750 | 100 | 156 | **192 |
| 1,000 | 72 | 134 | *192 |
| Dulcitol, mg. percent: | | | |
| 100 | 50 | 84 | 168 |
| 200 | 52 | 108 | 192 |
| 300 | 64 | 120 | 192 |
| 400 | 72 | 128 | *192 |
| 500 | 84 | 128 | **192 |
| 750 | 96 | 144 | **192 |
| 1,000 | 72 | 128 | 168 |
| Inositol, mg. percent: | | | |
| 100 | 62 | 102 | 144 |
| 200 | 68 | 92 | 168 |
| 300 | 70 | 106 | 168 |
| 400 | 84 | 120 | 168 |
| 500 | 84 | 112 | 192 |
| 750 | 96 | 132 | *192 |
| 1,000 | 72 | 120 | 192 |

1 Not tested.   2 Sample lost.

*Example X*

Further motility studies were conducted on poultry semen. When using undiluted cock semen as a control, the sperm cells were 52% motile after one day of storage and no sperms lived beyond the third day of storage. In contrast, the same semen diluted with a solution of sorbitol and mannitol in 500 mg. percent concentration showed 64% motility on the 7th day of storage and 51% motility on the 14th day. Turkey semen diluted with the same diluent solution containing sorbitol and mannitol exhibited 55% motility at the end of 7 days of storage and 25% motility at the end of 14 days of storage.

*Example XI*

A typical base solution for the collection of blood incorporating the alcohol preservatives may be made up as follows: An aqueous solution is made up containing two parts of trisodium citrate and/or tripotassium citrate; 0.42 part of sodium chloride; five parts of sorbitol, five parts of mannitol and 87.58 parts of distilled water. A small amount, such as 0.01 part of an antibiotic such as tetracycline hydrochloride (Achromycin) may optionally be included. Blood is added to this base solution in the proportion of about one volume of blood to 2 to 3 volumes of anti-coagulent preservative solution if the blood is to be used for testing purposes and in the proportion of about one volume of base solution to about three to eight volumes of blood if the blood is to be used for transfusion purposes.

*Example XII*

A further large scale field test was conducted utilizing bovine semen diluted 1:100 in a solution as described in Example I to observe the comparative effect of age of the semen upon fertility. A first group of 201 cows was serviced utilizing semen which was two days old. Of these, 82.8% became pregnant. A second batch of 542 cows was impregnated using three day old semen. Of this group, 82.5% of the cows were successfully bred. Semen which was four days old was used to service a third group of 240 cows, of whom 83.3% were successfully bred. A fourth group of 496 cows were serviced with five day old semen and 83.9% of those cows became pregnant.

The alcohol solutions according to the present invention may also be utilized in tissue culture. They are used to provide a nutrient environment for promoting the growth of living organisms outside of the body. For this purpose the solutions are desirably buffered and preferably contain sugar, such as glucose or fructose.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A stable composition of matter comprising animal semen containing living sperm cells admixture with a solution containing a small amount of at least one added stabilizing compound selected from the group consisting of sugar alcohols having the formula $C_nH_{n+2}(OH)_n$ wherein $n$ is a whole number from 4 to 7 and cyclitols having the formula $C_6H_6(OH)_6$ and derivatives thereof having the formulas $C_6H_6(OH)_5OCH_3$, $C_6H_6(OH)_4$, $C_6H_6O(OH)_5$, $C_6H_7(OH)_5$, $C_6H_8(OH)_4$ and $$C_6H_5(OH)_6CH_3$$

said added stabilizing compound being present in said solution in concentration between about 0.1% and 2% not to exceed the isotonic limit of the animal semen, and said solution of stabilizing compound also including at least one of the substances selected from the group consisting of hydrogen ion buffering material, sugar nutrients and colloid stabilizers.

2. A stable composition according to claim 1 in which said solution of added stabilizing compound includes erythritol.

3. A stable composition according to claim 1 in which said solution of added stabilizing compound includes sorbitol.

4. A stable composition according to claim 1 in which said solution of added stabilizing compound includes mannitol.

5. A stable composition according to claim 1 in which said solution of added stabilizing compound includes dulcitol.

6. A stable composition according to claim 1 in which said solution of added stabilizing compound includes an inositol.

7. A method of artificially inseminating female animals which comprises servicing said animals by introducing into the reproductive tract thereof a stable composition comprised of animal semen of the same species containing live sperm cells admixed in a solution containing a small quantity of at least one added stabilizing compound selected from the group consisting of sugar alcohols having the formula $C_nH_{n+2}(OH)_n$ wherein $n$ is a whole number from 4 to 7, and cyclitols having the formula $$C_6H_6(OH)_6$$

and derivatives thereof having the formulas $$C_6H_6(OH)_5OCH_3$$
$$C_6H_6(OH)_4$$
$$C_6H_6O(OH)_5$$
$$C_6H_7(OH)_5$$
$$C_6H_8(OH)_4$$

and $C_6H_5(OH)_6CH_3$, said added stabilizing compound being present in concentration between about 0.1% and 2% not to exceed the isotonic limit of the sperm cells.

8. A method according to claim 7 in which the solution of added stabilizing compound includes at least one hydrogen ion concentration buffering material in concentration between about 0.025% and 1.5% to protect the solution against rapid and material changes in hydrogen ion concentration.

9. A method according to claim 7 in which said semen is diluted with from 10 to 200 parts of said solution of added stabilizing compound to each part semen.

10. A method according to claim 7 in which the osmotic pressure of the semen mixture is between about 200 and 350 milliosmoles.

11. A method according to claim 7 in which said solution of added stabilizing compound includes sorbitol.

12. A method according to claim 7 in which said solution of added stabilizing compound includes mannitol.

13. A method according to claim 7 in which said solution of added stabilizing compound includes a mixture of sorbitol and mannitol.

14. A stable composition of matter comprising animal semen containing living sperm cells in admixture with a solution containing a small amount of at least one stabilizing compound selected from the group consisting of sugar alcohols having the formula $C_nH_{n+2}(OH)_n$ wherein $n$ is a whole number from 4 to 7 and cyclitols having the formula $C_6H_6(OH)_6$ and derivatives thereof having the formulas $C_6H_6(OH)_5OCH_3$, $C_6H_6(OH)_4$, $C_6H_6O(OH)_5$, $$C_6H_7(OH)_5$$
$$C_6H_8(OH)_4$$

and $C_6H_5(OH)_6CH_3$, said added stabilizing compound being present in said solution in concentration between about 0.1% and 2% not to exceed the isotonic limit of the animal semen and in an amount from about 10 to 200 times the amount of animal semen.

15. A stable composition of matter comprising animal semen containing living sperm cells in admixture with a solution containing a small amount of at least one added stabilizing compound selected from the group consisting of sugar alcohols having the formula $C_nH_{n+2}(OH)_n$ wherein $n$ is a whole number from 4 to 7 and cyclitols having the formula $C_6H_6(OH)_6$ and derivatives thereof having the formulas $C_6H_6(OH)_5OCH_3$, $C_6H_6(OH)_4$, $C_6H_6O(OH)_5$, $C_6H_7(OH)_5$, $C_6H_8(OH)_4$ and $$C_6H_5(OH)_6CH_3$$

said added stabilizer compound being present in said solution in concentration between about 0.1% and 2% not to exceed the isotonic limit of the animal semen, said semen mixture having an osmotic pressure between about 200 and 300 milliosmoles.

16. A stable composition of matter comprising animal semen containing living sperm cells in admixture with a solution containing a small amount of ribitol, said ribitol being present in said solution in concentration between about 0.1% and 2% not to exceed the isotonic limit of the animal semen.

17. A stable composition of matter comprising animal semen containing living sperm cells in admixture with a solution containing a small amount of a mixture of sorbitol and mannitol, said mixture of sorbitol and mannitol being present in said solution in concentration between about 0.1% and 2% not to exceed the isotonic limit of the animal semen.

18. A stable composition of matter comprising animal semen containing living sperm cells in admixture with a solution containing a small amount of xylitol, said xylitol being present in said solution in concentration between about 0.1% and 2% not to exceed the isotonic limit of the animal semen.

19. A stable composition of matter comprising animal semen containing living sperm cells in admixture with a solution containing a small amount of arabitol, said arabitol being present in such solution in concentration between about 0.1% and 2% not to exceed the isotonic limit of the animal semen.

20. A method according to claim 7 in which the solution of added stabilizing compound includes at least one sugar nutrient.

21. A method according to claim 7 in which the solution of added stabilizing compound includes at least one water soluble colloid shock stabilizer.

22. A dry powdered preservative composition for solution in about 100 parts of weight by water and admixture with about 0.5 to 10 parts by weight of animal semen to maintain the potency thereof, which composition comprises a mixture of from about 0.1 to 2 parts by weight of a dry powdered stabilizing compound selected from the group consisting of sugar alcohols having the formula $C_nH_{n+2}(OH)_n$ wherein $n$ is a whole number from 4 to 7, and cyclitols having the formula $C_6H_6(OH)_6$, and derivatives thereof having the formulas $C_6H_6(OH)_5OCH_3$, $C_6H_6(OH)_4$, $C_6H_6O(OH)_5$, $C_6H_7(OH)_5$, $C_6H_8(OH)_4$ and $C_6H_5(OH)_6CH_3$, from about 0.025 to 1.5 parts by weight of at least one dry powdered hydrogen ion concentration buffering material to protect the semen solution against rapid and material changes in hydrogen ion concentration, and from about 8 to 10 parts by weight of dried powdered egg yolk.

23. A preservative composition according to claim 22 also containing from about 0.125 to 0.75 part by weight of at least one dry powdered sugar nutrient, from about 0.1 to 1 part by weight of at least one dry powdered water soluble colloid shock stabilizer and from about 1 to 3 parts by weight of dry powdered milk.

References Cited by the Examiner

Nature: vol. 178, July 21, 1956, pages 142 and 143.
Mann: Chem. Abst., vol. 50, 1956, page 15796d.
Shergin: Chem. Abst., vol. 51, 1957, page 10696c.
Perez: Chem. Abst., vol. 52, 1958, page 1419a.
Emmens: The Australian Veterinary Journal, vol. 26, September 1950, pages 226 to 228.

LEWIS GOTTS, *Primary Examiner.*

WILLIAM B. KNIGHT, MORRIS O. WOLK, JULIAN S. LEVITT, IRVING MARCUS, *Examiners.*

Dedication 3,185,623.—*Fred Smith*, Wayzata, and *Edmund F. Graham*, St. Paul Minn. PRESERVATION OF ANIMAL SEMEN. Patent dated May 25, 1965. Dedication filed June 5, 1968, by the assignee, *The Regents of the University of Minnesota*.

Hereby dedicates to the Public the entire term of said patent.
[*Official Gazette November 19, 1968.*]